United States Patent
Malkin et al.

(10) Patent No.: US 9,680,753 B2
(45) Date of Patent: Jun. 13, 2017

(54) SYSTEMS AND METHODS FOR WIRELESS COMMUNICATION WITH ASYMMETRIC NUMBERS OF TRANSMIT AND RECEIVE CHAINS

(71) Applicant: QUALCOMM Incorporated, San Diego, CA (US)

(72) Inventors: Yoseph Yitzhak Malkin, Palo Alto, CA (US); Sudheep Karan Reddy Thota, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 14/149,179

(22) Filed: Jan. 7, 2014

(65) Prior Publication Data

US 2015/0195836 A1   Jul. 9, 2015

(51) Int. Cl.
*H04W 72/04*   (2009.01)
*H04L 12/801*   (2013.01)
*H04W 80/04*   (2009.01)
*H04W 84/12*   (2009.01)

(52) U.S. Cl.
CPC .......... *H04L 47/14* (2013.01); *H04W 80/045* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,643,848 B2 * | 1/2010 | Robinett | H04B 1/006 455/103 |
| 8,064,958 B2 | 11/2011 | Skarby et al. | |
| 8,095,099 B2 | 1/2012 | Patel et al. | |
| 8,155,608 B2 * | 4/2012 | Xing | H04W 36/30 455/132 |
| 8,229,352 B2 | 7/2012 | Doan et al. | |
| 8,369,440 B2 * | 2/2013 | Senba | H04B 7/0628 375/144 |
| 8,897,343 B2 * | 11/2014 | Gauthier | H04B 7/0811 375/219 |
| 2005/0141459 A1 * | 6/2005 | Li et al. | 370/334 |
| 2007/0298742 A1 * | 12/2007 | Ketchum et al. | 455/186.1 |
| 2009/0046800 A1 * | 2/2009 | Xu et al. | 375/267 |
| 2010/0022192 A1 | 1/2010 | Knudsen et al. | |
| 2011/0261860 A1 * | 10/2011 | Zhang et al. | 375/130 |
| 2012/0120998 A1 * | 5/2012 | Fakhrai et al. | 375/224 |
| 2012/0257494 A1 | 10/2012 | Chin et al. | |
| 2014/0233526 A1 * | 8/2014 | Molinero | 370/330 |
| 2014/0269994 A1 * | 9/2014 | HomChaudhuri et al. | 375/316 |
| 2015/0133185 A1 * | 5/2015 | Chen et al. | 370/338 |

* cited by examiner

*Primary Examiner* — Chi H Pham
*Assistant Examiner* — Soon-Dong D Hyun
(74) *Attorney, Agent, or Firm* — Pardice and Li LLP

(57) ABSTRACT

This disclosure includes systems and methods for wireless communication using asymmetric transmit and receive chains. A device having a greater number of receive chains may be optimized for data reception and a device having a greater number of transmit chains may be optimized for data transmission. The relative ratio in performance between desired uplink and downlink performance may be adjusted accordingly. In one aspect, one wireless protocol may be used for communications to maintain a unidirectional link on another.

17 Claims, 6 Drawing Sheets

SYSTEMS AND METHODS FOR WIRELESS COMMUNICATION WITH ASYMMETRIC NUMBERS OF TRANSMIT AND RECEIVE CHAINS

FIELD OF THE PRESENT DISCLOSURE

This disclosure generally relates to wireless communication systems and more specifically to systems and methods for providing differing numbers of transmit and receive chains to achieve one or more desired performance characteristics.

BACKGROUND

Due to advances in technologies used for wireless communications, such as those associated with a Wireless Local Area Network (WLAN) conforming to Institute for Electrical and Electronic Engineers (IEEE) 802.11 protocols, wireless communications devices may feature multiple transmit and receive chains to provide increased bandwidth and achieve greater throughput. For example, the 802.11ad standard includes the capability for devices to communicate in the 60 GHz frequency band over four, 2.16 GHz-wide channels, delivering data rates of up to 7 Gbps. Other standards may also involve the use of multiple channels operating in other frequency bands, such as the 5 GHz band.

As will be appreciated, in order to provide multiple chains, a number of elements may be required by each chain. For example, each chain may require on-chip and off-chip components such as an antenna, an external power amplifier, a transmit-receive switch, a matching network, a low noise amplifier and/or other related circuitry, resulting in significant cost, area, complexity and power demands. Conventional implementations may provide symmetric transmit and receive capabilities, such as by providing all chains with the capability of transmitting and receiving. Accordingly, such devices typically exhibit performance associated with having equal numbers of transmit and receive chains.

However, there may be applications for which an intended use of a wireless communications device makes it desirable to provide one or more performance characteristics associated with employing asymmetric numbers of transmit and receive chains. It may also be desirable to reduce hardware complexity and cost while providing a level of performance associated with an intended use of the device. As will be detailed in the materials below and the accompanying drawings, this disclosure satisfies these and other goals.

SUMMARY

This disclosure involves systems for wireless communication, and may be directed to a wireless communications device comprising a first wireless local area network (WLAN) module that may use a first wireless protocol having m receive chains and n transmit chains, wherein m and n are non-negative integers and m does not equal n. As desired, m and n may be selected to provide a desired performance characteristic.

In one aspect, n may be zero, such that the wireless communications device also includes a second WLAN module that may use a second wireless protocol and a transmission controller that may determine information regarding first wireless protocol communications for transmission by the second WLAN module using the second wireless protocol. Further, the information regarding first wireless protocol communications indicates data successfully received by the first WLAN module. Also, the second WLAN module may include an acknowledgement buffer, wherein the transmission controller may store the information regarding first wireless protocol communications in the acknowledgement buffer and wherein the second WLAN module may transmit the information from the acknowledgement buffer using the second wireless protocol. Additionally, the first wireless protocol may operate on a 60 GHz frequency band and wherein the second wireless protocol may be a legacy protocol operating on a different frequency band.

In another aspect, wherein m may be zero and the wireless communications device may include a second WLAN module that may use a second wireless protocol and a reception controller that may determine information regarding first wireless protocol communications from transmissions received by the second WLAN module. As desired, the first WLAN module may retransmit data indicated as not being successfully received by the information regarding first wireless protocol communications.

This disclosure also includes methods for wireless communication using an asymmetric number of transmit and receive chains. For example, a suitable method may involve providing a first wireless local area network (WLAN) module that may use a first wireless protocol having m receive chains and n transmit chains, wherein m and n are non-negative integers and m does not equal n and performing a communications operation by receiving data using the m receive chains or transmitting data using the n transmit chains. The numbers of transmit and receive chains m and n may be selected to provide a desired performance characteristic.

In one aspect, n may be zero and the method may include providing a second WLAN module that may use a second wireless protocol, determining information regarding first wireless protocol communications and transmitting the information regarding first wireless protocol communications using the second wireless protocol with the second WLAN module. The information regarding first wireless protocol communications may indicate data successfully received by the first WLAN module. Further, the second WLAN module may also have an acknowledgement buffer, such that the method includes storing the information regarding first wireless protocol communications. In one embodiment, the first wireless protocol may operate on a 60 GHz frequency band and the second wireless protocol may be legacy protocol operating on a different frequency band.

In another aspect, m may be zero and the method may include providing a second WLAN module that may use a second wireless protocol and determining information regarding first wireless protocol communications from transmissions received by the second WLAN module. Further, the method may include retransmitting data indicated as not being successfully received by the information regarding first wireless protocol communications.

This disclosure also is directed to a non-transitory processor-readable storage medium for a wireless communications device, the processor-readable storage medium having instructions thereon, when executed by a processor that may cause the wireless communications device to enable a first wireless local area network (WLAN) module to use a first wireless protocol having m receive chains and n transmit chains, wherein m and n are non-negative integers and m does not equal n and to perform a communications operation such as receiving data using the m receive chains or transmitting data using the n transmit chains.

In one aspect, n may be zero and the instructions may cause the wireless communications device to determine information regarding first wireless protocol communications and transmit the information regarding first wireless protocol using a second wireless protocol with a second WLAN module.

In another aspect, m may be zero and the instructions may cause the wireless communications device to determine information regarding first wireless protocol communications from transmissions received by a second WLAN module. Additionally, the instructions may cause the wireless communications device to retransmit data indicated as not being successfully received by the information regarding first wireless protocol communications.

BRIEF DESCRIPTION OF THE DRAWINGS

Further features and advantages will become apparent from the following and more particular description of the preferred embodiments of the disclosure, as illustrated in the accompanying drawings, and in which like referenced characters generally refer to the same parts or elements throughout the views, and in which.

DETAILED DESCRIPTION

Figure 1:
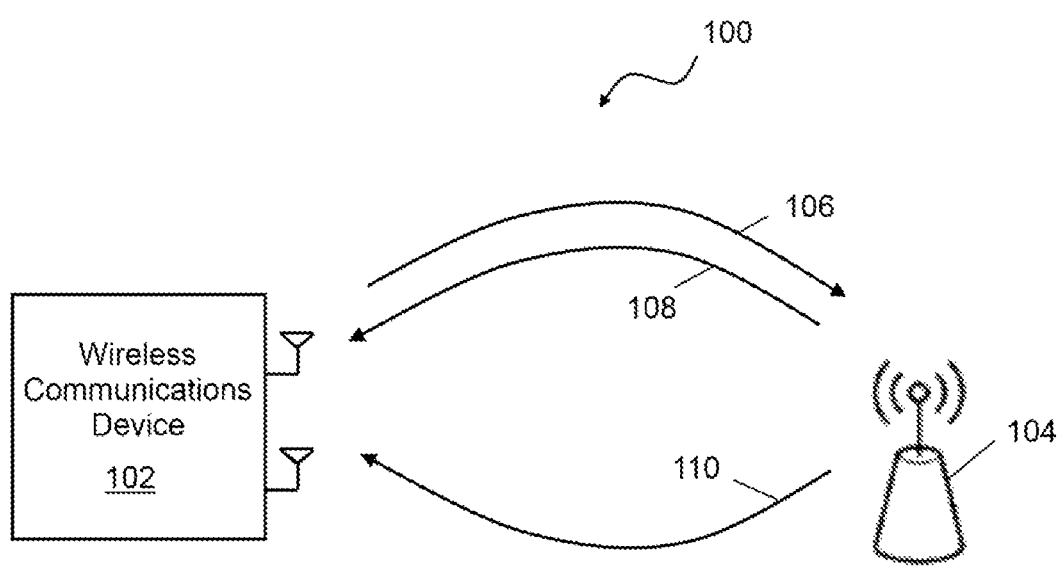
FIG. 1 schematically depicts a wireless system involving a device having asymmetric transmit and receive chains, according to one embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments that may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Embodiments are described herein with regard to a wireless communications device, which may include any suitable type of user equipment, such as a system, subscriber unit, subscriber station, mobile station, mobile wireless terminal, mobile device, node, device, remote station, remote terminal, terminal, wireless communication device, wireless communication apparatus, user agent, or other client devices. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system. Moreover, embodiments may also be described herein with regard to an access point (AP). An AP may be utilized for communicating with one or more wireless nodes and may be termed also be called and exhibit functionality associated with a base station, node, Node B, evolved NodeB (eNB) or other suitable network entity. An AP communicates over the air-interface with wireless terminals. The communication may take place through one or more sectors. The AP may act as a router between the wireless terminal and the rest of the access network, which may include an Internet Protocol (IP) network, by converting received air-interface frames to IP packets. The AP may also coordinate management of attributes for the air interface, and may also be the gateway between a wired network and the wireless network.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

As indicated, this disclosure involves systems and methods for wireless communication using asymmetric transmit and receive chains. To help illustrate certain aspects, an exemplary WLAN communication system 100 is depicted in FIG. 1. In this simplified example, wireless communications device 102 is associated with access point (AP) 104 in a conventional infrastructure WLAN. The techniques of this disclosure may also be applied to any other suitable network role, including communications with another device in a peer to peer network such as WiFi Direct™ or function as a software-enabled AP (softAP) serving one or more clients. FIG. 1 schematically indicates communications that may be exchanged between wireless communications device 102 and AP 104 using an asymmetric number of transmit and receive chains, as viewed from the perspective of wireless communications device 102. For example, wireless communications device 102 sends data over one transmit chain to generate uplink stream 106 and receives downlink streams 108 and 110 using two corresponding receive chains.

As such, the configuration of wireless communications device 102 shown allows for the reception of data using two chains and the transmission of data using one chain. This configuration may be desirable for applications in which the device is primarily a sink for data. Under these circumstances, it may be desirable to provide relatively greater downlink bandwidth to facilitate reception of data and to provide relatively reduced uplink bandwidth, which may still be sufficient for the more modest transmission requirements, such as acknowledgement messages. In one embodiment, wireless communications device 102 may be configured to employ four receive chains using an 802.11ad protocol operating on the 60 GHz frequency band. Alternatively, a device may employ more transmit chains than receive chains if the device's primary function is the transmission of data, such as in a multicasting application. Further, the ratio in performance between desired uplink and downlink performance may be achieved directly by changing the numbers of transmit and receive chains.

In some embodiments, transmit stream 106 and receive streams 108 and 110 may be configured to employ the same frequency band, such as the 60 GHz band. In other embodiments, any desired combination of frequency bands may be employed. For example, transmit stream 106 and receive stream 108 may employ a first frequency band, such as one of the 2.4 or 5 GHz bands, and receive stream 110 may employ a second frequency band, such as the 60 GHz band. Accordingly, in some embodiments, no receive or transmit chain may be provided in one of the frequency bands. For example, a device that is primarily intended to receive data may feature no transmit chains and one or more receive chains operating on the 60 GHz band. Uplink communications associated with managing downlink operations or otherwise maintaining the link may include information regarding communications using the wireless protocol associated with the 60 GHz band, such as acknowledgements and other control information, may be performed on the 2.4 GHz or 5 GHz frequency band. In this manner, downlink performance may take advantage of the increased throughput associated with use of the 60 GHz band and any necessary uplink transmissions may take place over a more power efficient frequency band. Furthermore, these techniques may be readily applied to wireless protocols operating on any other frequency bands as desired.

Figure 2:
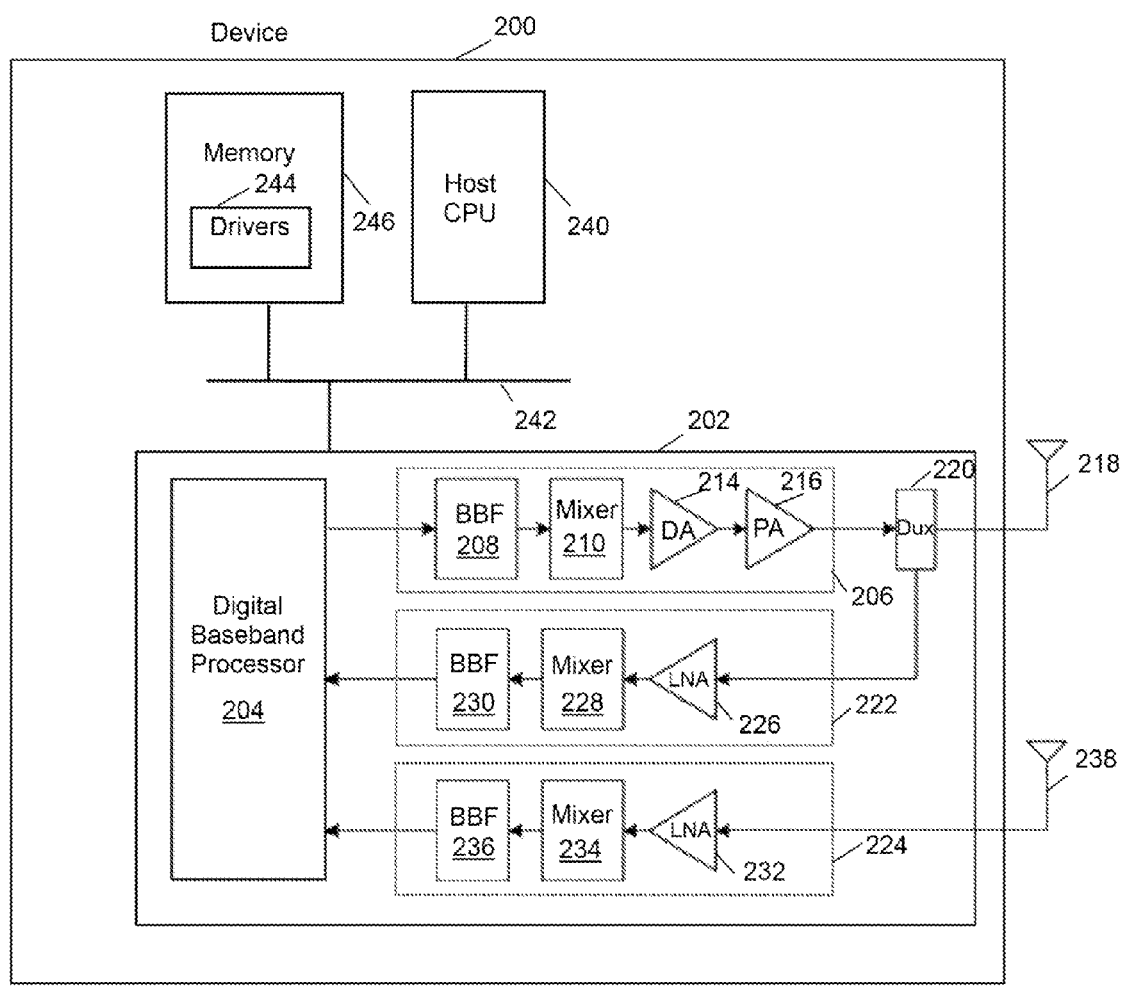
FIG. 2 schematically depicts functional blocks of a wireless communications device, according to one embodiment.

Further details are provided in the context of wireless communications device 200 embodying aspects of this disclosure as schematically illustrated in FIG. 2. Generally, wireless communications device 200 may employ an architecture in which the lower levels of the WLAN protocol stack are implemented in firmware and hardware modules of WLAN module 202. WLAN module 202 may include digital baseband processor 204 for performing operations at the media access control (MAC) layer to handle and process 802.11 frames of data including verification, acknowledgment, routing, formatting and other applicable functions. Digital baseband processor 204 may also perform operations at the physical (PHY) layer, exchanging incoming and outgoing frames with the MAC layer by modulating and demodulating the frames according to the relevant 802.11 protocol.

In this embodiment, digital baseband processor 204 outputs an analog stream for transmission that if fed to the analog portion of a transmit chain, indicated by box 206. Components within the transmit chain may include baseband filter (BBF) 208, to reduce noise resulting from the digital-to-analog conversion process in digital baseband processor 204. Mixer block 210 may up-convert the analog signal to a desired transmission radio frequency (RF) using a suitable signal, such as from a local oscillator. Next, a sequence of amplifiers, such as driver amplifier (DA) 214 and an external power amplifier (PA) 216 may boost the signal to an adequate level for transmission. The RF signal may then be coupled to antenna 218 for transmission through duplexer (Dux) 220. As desired, a switch or other equivalent element may be used. Depending upon the architecture of wireless communications device 200, other conventional circuit elements may be present in the transmit chain.

According to the techniques of this disclosure, RF signals may be received using an asymmetric number of receive chains. In this embodiment, the analog portions of suitable receive chains are indicated by box 222 and 224. As shown, the receive chain indicated by box 222 may be configured to share antenna 218, such that the received RF signal is fed by duplexer 220. Generally, the received signal may be amplified by low noise amplifier (LNA) 226, down-converted in frequency, such as to baseband, by mixer 228 responsive to a suitable signal and then processed by BBF 230 before being fed to digital baseband processor 204. After conversion to digital, the stream may be processed to recover the payload. Likewise, the receive chain indicated by box 224 may also include LNA 232, mixer 234 and BBF 236 and may be coupled to antenna 238. As with the transmit chain, the receive chains may also include other or different conventional circuit elements. The transmit chain indicated by box 206 and the receive chain indicated by box 222 may share antenna 218 in this embodiment, although any suitable number of antennas may be employed and/or shared by the transmit and receive chains using known techniques.

Further, wireless communications device 200 may also include host CPU 240 configured to perform the various computations and operations involved with the functioning of wireless communications device 200. Host CPU 240 is coupled to WLAN module 202 through bus 242, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. Upper layers of the protocol stacks of the WLAN system may be implemented in software as Drivers 244 stored in memory 246 that may be accessed by host CPU 240 over bus 242

Correspondingly, wireless communications device 200 may be seen to enable transmission of a single stream using one transmit chain and to enable reception of two streams using the receive chains. As described above, the use of asymmetric numbers of transmit and receive chains allows wireless communications device 200 to be tailored to provide one or more desired performance characteristics. In this example, the use of two receive chains provides relatively greater downlink bandwidth as compared to uplink bandwidth and may be suited to applications in which wireless communications device 200 is primarily a recipient of wireless data. By employing different numbers of transmit and receive chains, other performance characteristics may be emphasized as desired.

Further, by employing asymmetric numbers of transmit and receive chains, substantial economies of hardware, cost, complexity and power consumption may be realized. Notably, this implementation saves the resources represented by a second transmit chain, including a duplexer or other antenna switching mechanism, an amplifier chain, an upconverting mixer and associated local oscillator and a filter as well as other circuit elements that may be used in the transmit chain. In particular, the power amplifier represents a significant savings in the context of the resource budget. As will be appreciated in the example of wireless communications device 200, equivalent downlink performance may be achieved as compared to a conventional architecture using symmetric transmit and receive chains while avoiding the need to provide a second transmit chain. Further, omitting one or more receive chains compared to the number of transmit chains may represent a savings of the associated amplifiers, downconverting mixers, filters and related circuitry. In other implementations, any desired balance between uplink and downlink performance may be achieved by adjusting the number of transmit chains and the number of receive chains.

Figure 3:
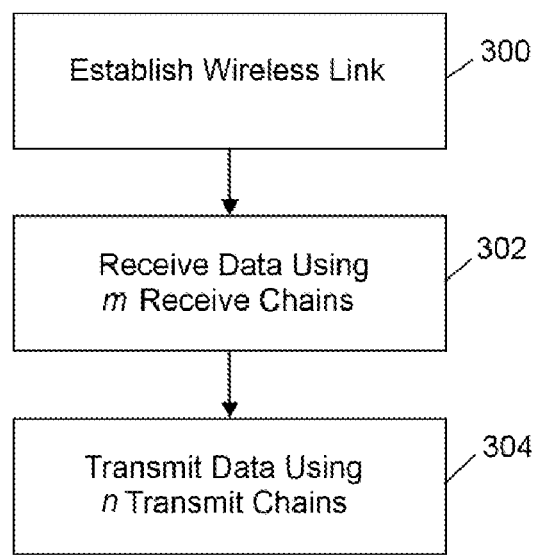
FIG. 3 is a flowchart showing an exemplary routine for communicating using a device having asymmetric transmit and receive chains, according to one embodiment.

An example of the operation of a wireless communications device embodying aspects of this disclosure is represented by the flowchart depicted in FIG. 3. As shown, a suitable routine may begin in 300 by establishing a WLAN connection between a wireless communications device having asymmetric numbers of transmit and receive chains and a remote device, which may also be configured to employ asymmetric transmit and receive chains or may be conventionally configured as desired. As indicated by 302, the wireless communications device may receive downlink data from the remote device using m receive chains, wherein m is any suitable non-negative integer. Correspondingly, as indicated by 304, the wireless communications device may transmit uplink data to the remote device using n transmit chains, wherein n is any suitable non-negative integer not equal to m. As described above, any desired relation between downlink and uplink performance may be achieved by adjusting the ratio of m to n.

In a further aspect, providing asymmetric transmit and receive chains may include configuring a device to have either no transmit chains or no receive chains for a first wireless protocol. In such implementations, any data traffic necessary to establish and maintain the communications link for the first wireless protocol may be exchanged using a second wireless protocol. A suitable example of a wireless communications device having no transmit chain for a first wireless protocol is depicted schematically in FIG. 4. As shown, wireless communications device 400 may employ an architecture in which the lower levels of the WLAN protocol stack are implemented in firmware and hardware of WLAN module 402, which is configured to employ a first wireless protocol and may have one or more receive chains only. In one embodiment, WLAN module 402 may operate on the 60 GHz frequency band utilizing an 802.11ad protocol. WLAN module 402 may include a media access controller (MAC) 404 that performs functions related to the handling and processing of 802.11 frames of data including verification, acknowledgment, routing, formatting and the like. Incoming frames received from physical layer (PHY) 406, which as shown here includes the functions of demodulating the frames according to the relevant 802.11 protocol and the modulation and coding scheme (MCS) employed, which may be determined using an appropriate rate adaptation algorithm, for example. Analog receive chain 408 provides the analog amplification, mixing and filtering processing as described above for RF signals received via antenna 410. Verifier 412 assesses whether a transmission has been successfully received, such as by employing a cyclic redundancy check (CRC) on received frames and/or using a checksum to ascertain which sub-frames of an aggregated frame have been received, using conventional techniques. Although depicted with a single receive chain to simplify the illustration, wireless communications device 400 may be configured with any suitable number of receive chains to provide the desired level of performance.

Wireless communications device 400 may also include another WLAN module 414 configured to employ a different wireless protocol. For example, WLAN module 414 may use any suitable 802.11 a/b/g/n/ac protocol and may operate on the 2.4 GHz or 5 GHz frequency band. Similarly, WLAN module 414 may include MAC 416 and PHY 418 to perform the operations described above. In this embodiment, WLAN module 414 provides duplex communication as indicated by analog receive chain 420 and transmit chain 422 that are coupled by duplexer 424 to antenna 426 to transmit and receive RF signals. Other antenna coupling techniques such as a switch may be used as desired. WLAN module 414 may also have acknowledgement (ACK) buffer 428 to facilitate feedback regarding frames received by WLAN module 402 as will be described below.

Wireless communications device 400 may also include host CPU 430 configured to perform the various computations and operations involved with the functioning of wireless communications device 400, including the functionality associated with the upper layers of the WLAN protocol stack as noted above. Host CPU 430 is coupled to WLAN module 402 and WLAN module 414 through bus 432. Memory 434 may be coupled to bus 432 to store transmitted and received information and processor-readable instructions, such as software, related to the operation of host CPU 430. In this implementation, reception (Rx) coordinator 436 may control WLAN module 414 to provide acknowledgment of data received using WLAN module 402 and other information regarding first wireless protocol communications as described below. In one alternative embodiment, the functionality of Rx coordinator 436 may be implemented at the MAC layer of either or both of WLAN modules 402 and 414. In such an embodiment, a hardware interconnect 438 (indicated as a dashed line as an optional feature) or equivalent circuitry may provide communication regarding the status of frames between the WLAN modules. The use of hardware interconnect 438 may facilitate satisfying any timing requirements regarding the acknowledgement of received frames that may be imposed by the wireless protocol used by WLAN module 402.

In the depicted embodiment, WLAN module 402 is coupled to antenna 410 and WLAN module 414 is coupled to antenna 426. As desired and depending upon other wireless protocols employed, one or more antennas may be shared between WLAN modules or circuitry configured to employ other wireless communication protocols using switching techniques known in the art. Likewise, some or all elements of the respective WLAN modules may be co-located on a common system (e.g., on the same circuit board or on distinct circuit boards within the same system, or may be embedded on the same integrated circuit as in a system on a chip (SoC) implementation).

Figure 5:
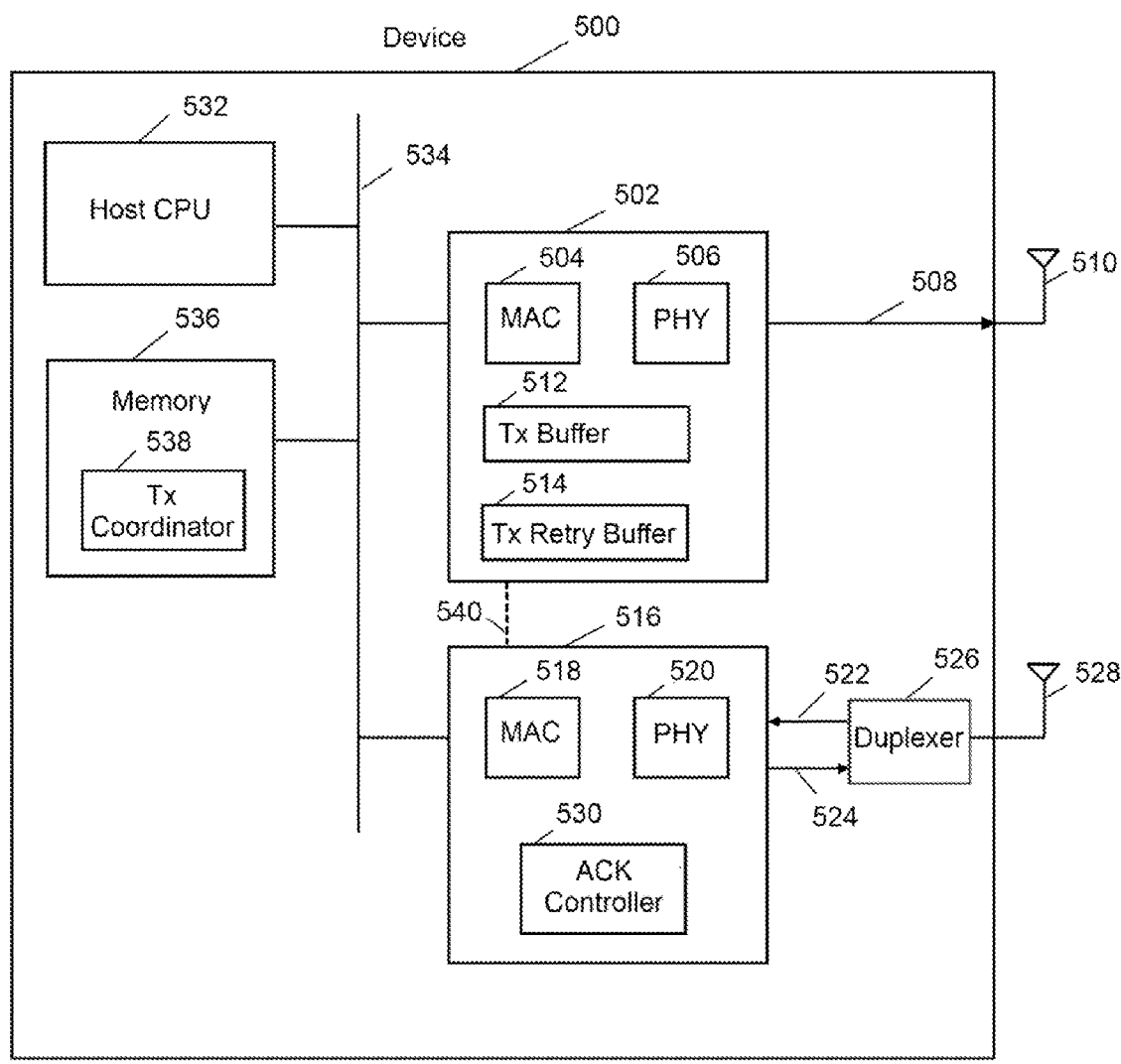
FIG. 5 schematically depicts functional blocks of a wireless communications device configured for unidirectional transmission, according to one embodiment.

Accordingly, wireless communications device 400 may receive unidirectional data over WLAN module 402 while providing the control and management communication necessary to maintain the first wireless protocol link using WLAN module 414. Wireless communications device 400 may receive transmissions from a suitably configured device, such as wireless communications device 500 as depicted in FIG. 5. As shown, wireless communications device 500 may have a similar design, including WLAN module 502 employing the same wireless protocol as WLAN module 402. WLAN module 502 correspondingly may have MAC 504 and PHY 506 to generate analog transmit chain 508, which is coupled to antenna 510. In this embodiment, wireless communications device 500 has asymmetrical transmit and receive chains in the form of one transmit chain and no receive chains. Although a single transmit chain is shown for clarity, any desired number of transmit chains may be used. In one aspect, the number of transmit chains may be selected to correspond to the number of receive chains provided by the intended recipient. Further, in other embodiments, any desired number of receive chains may also be employed, either in a conventional, symmetrical relationship to the number of transmit chains or an asymmetrical number according to the techniques of this disclosure. WLAN module 502 may also include transmission (Tx) buffer 512 to store frames or aggregated frames for delivery. As will be described below, frames or sub-frames that were not successfully received by wireless communications device 400 may be transferred to Tx retry buffer 514 for another delivery attempt.

In a similar manner to wireless communications device 400, wireless communications device 500 may also include WLAN module 516 configured to employ the wireless protocol used by WLAN module 414. As such, WLAN module 516 may also include MAC 518 and PHY 520 to perform the operations described above with respect to analog receive chain 522 and transmit chain 524 that are coupled by duplexer 526, or other suitable switching means, to antenna 528. WLAN module 516 may also have ACK controller 530 to receive acknowledgments sent by wireless communications device 400 regarding the reception of frames or sub-frames sent by WLAN module 502.

Also similarly, wireless communications device 500 may include host CPU 532 coupled to WLAN module 502 and WLAN module 516 through bus 534. Memory 536 may be coupled to bus 534 to store transmitted and received information and processor-readable instructions, such as software, related to operation of host CPU 532. Here, transmission coordinator 538 may process information from ACK controller 530 to determine which frames or sub-frames transmitted by WLAN module 502 were not successfully received by wireless communications device 400. In turn, Tx coordinator 538 may populate Tx retry buffer 514 with data that was not successfully received. In an alternative embodiment, the functionality of Tx coordinator 538 may be implemented at the MAC layer of either or both of WLAN modules 502 and 516, and may employ hardware interconnect 540 (indicated as a dashed line as an optional feature) to provide communication regarding the status of frames between the WLAN modules.

Figure 4:
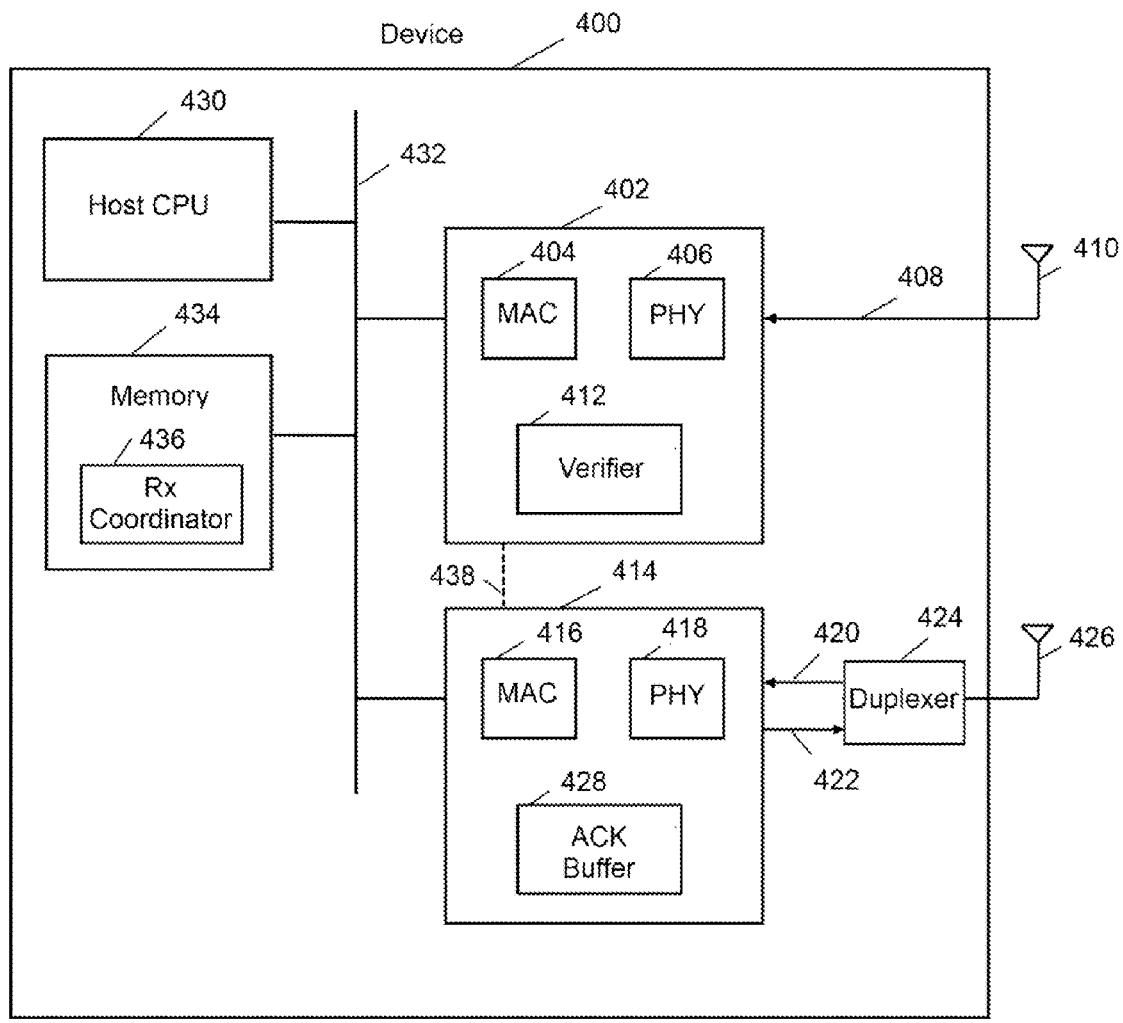
FIG. 4 schematically depicts functional blocks of a wireless communications device configured for unidirectional reception, according to one embodiment.

Although in the embodiments shown in FIGS. 4 and 5 reception coordinator 436 is depicted as software routines stored in memory 434, transmission coordinator 538 is depicted in memory 536 and verifier 412 is depicted as being implemented in firmware at the MAC layer, these functionalities may be achieved using any desired combination of firmware, hardware or software at suitable locations in the architecture of the respective wireless communications devices.

Figure 6:
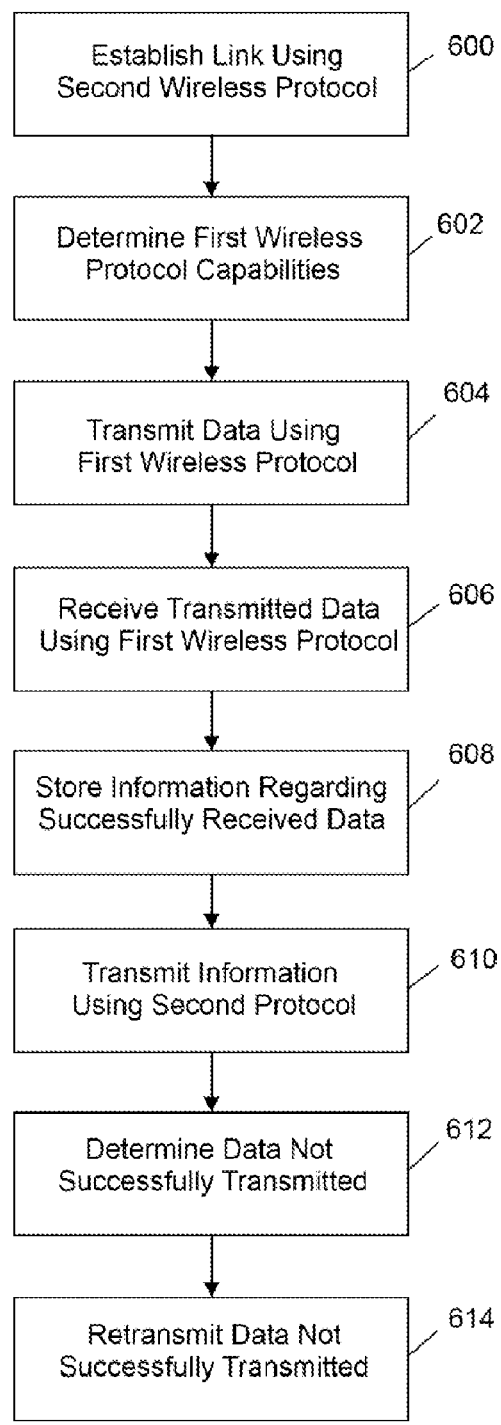
FIG. 6 is a flowchart showing an exemplary routine for unidirectional wireless communication using a device having asymmetric transmit and receive chains, according to one embodiment.

Accordingly, wireless communications device 400 and wireless communications device 500 may be configured to perform unidirectional delivery of information using a first wireless protocol and to perform any communications associated with establishing and maintaining the first wireless protocol link using a second wireless protocol. The communications associated with establishing and maintaining the first wireless protocol link may include acknowledgements, management and control messages, and other information regarding first wireless protocol communications. In one aspect, the first wireless protocol may achieve one or more desired performance characteristics in relation to the second wireless protocol, such as improved throughput, bandwidth or the like. For example, the first wireless protocol may operate on the 60 GHz frequency band using an 802.11ad protocol to achieve a relatively high transfer rate and the second wireless protocol may be a legacy protocol, such as any suitable 802.11a/b/g/n/ac protocol operating on the 2.4 GHz or 5 GHz frequency bands, and may represent a more efficient protocol with regard to the amount of information associated with establishing and maintaining the communications link over the first wireless protocol. To help illustrate aspects regarding the operation of wireless communications device 400 to receive data transmitted by wireless communications device 500 using the first wireless protocol, a representative routine is depicted in the flowchart of FIG. 6.

Beginning with 600, wireless communications device 400 and wireless communications device 500 may establish a communications link with the second wireless protocol, using WLAN module 414 and WLAN module 516 respectively. In 602, the devices may advertise capabilities regarding communications using the first wireless protocol and negotiate any necessary parameters. For example, wireless communications device 400 may advertise the reception capabilities associated with WLAN module 402. Upon determination of the ability of wireless communications device 400 to receive communications using the first wireless protocol, wireless communications device 500 may allocate any desired amount of subsequent downlink data for transmission with WLAN module 502, storing such data in Tx buffer 512. Correspondingly, in 604, wireless communications device 500 may transmit one or more frames or aggregate frames destined for wireless communications device 400 using WLAN module 502. In 606, the one or more frames or aggregate frames may be received by WLAN module 402 and checked for accuracy using verifier 412. Rx coordinator 436 then may send information regarding any successfully received frames to ACK buffer 428 in 608. Wireless communications device 400 may transmit information from ACK buffer 428 to wireless communications device 500 using WLAN module 414 in 610. As desired, ACK buffer 428 may be associated with an elevated priority to facilitate providing feedback to wireless communications device 500 regarding successfully received transmissions in a timely manner. The received acknowledgement information may be processed by ACK controller 530 at wireless communications device 500 to identify the one or more frames or sub-frames transmitted by WLAN module 502 that have successfully been received by wireless communications device 400 in 612. In response, Tx coordinator 538 may populate Tx retry buffer 514 with any transmitted frames or sub-frames that were not acknowledged, so that they may be subsequently retransmitted as indicated by 614.

Using these techniques, ACKs, or block acknowledgements (BAs), may be communicated to WLAN module 502 using information exchanged between WLAN module 414 and WLAN module 516. Depending upon the nature of the downlink data being received, it may also be desirable for wireless communications device 400 to transmit information regarding transmission control protocol (TCP) or internet protocol (IP) data, such as TCP ACKs, upper layer control traffic, or the like, to wireless communications device 500. Accordingly, the network layer, implemented in memory 434 for example, of wireless communications device 400 may be configured to direct any outgoing traffic to ACK buffer 428 for transmission by WLAN module 414. Further, it may be desirable to modify the first wireless protocol as necessary to accommodate any additional latency that may be associated with transmitting acknowledgement information using the second wireless protocol.

Described herein are presently preferred embodiments. However, one skilled in the art that pertains to the present embodiments will understand that the principles of this disclosure can be extended easily with appropriate modifications to other applications.

What is claimed is:
1. A wireless communications device comprising:
a first wireless local area network (WLAN) module configured to communicate using a first wireless protocol, the first WLAN module having at least a number (m) of receive chains and no transmit chains, wherein m is a fixed non-negative integer;

a transmission controller configured to determine information regarding communications received according to the first wireless protocol; and a second WLAN module configured to transmit the information using a second wireless protocol.

2. The wireless communications device of claim 1, wherein m is configured to provide a desired performance characteristic.

3. The wireless communications device of claim 1, wherein the information indicates data successfully received by the first WLAN module.

4. The wireless communications device of claim 3, wherein the information is stored in an acknowledgement buffer, and wherein the second WLAN module is further configured to transmit the information from the acknowledgement buffer.

5. The wireless communications device of claim 1, wherein the first wireless protocol operates on a 60 GHz frequency band and wherein the second wireless protocol is a legacy protocol operating on a different frequency band.

6. A method for wireless communications by a wireless communications device, comprising:
 operating a first wireless local area network (WLAN) module to communicate using a first wireless protocol, the first WLAN module having at least a number (m) of receive chains and no transmit chains, wherein m is a fixed non-negative integer;
 determining information regarding communications received according to the first wireless protocol; and
 operating a second WLAN module to transmit the information using a second wireless protocol.

7. The method of claim 6, wherein m is configured to provide a desired performance characteristic.

8. The method of claim 6, wherein the information indicates data successfully received by the first WLAN module.

9. The method of claim 8, further comprising storing the information in an acknowledgement buffer.

10. The method of claim 6, wherein the first wireless protocol operates on a 60 GHz frequency band and wherein the second wireless protocol is a legacy protocol operating on a different frequency band.

11. A non-transitory processor-readable medium storing instructions that, when executed by a processor of a wireless communications device, causes the wireless communications device to:
 operate a first wireless local area network (WLAN) module to communicate using a first wireless protocol, the first WLAN module having at least a number (m) of receive chains and no transmit chains, wherein m is a fixed non-negative integer;
 determine information regarding communications received according to the first wireless protocol; and
 operate a second WLAN module to transmit the information using a second wireless protocol.

12. A wireless communications device comprising:
 a first wireless local area network (WLAN) module configured to communicate using a first wireless protocol, the first WLAN module having at least a number (n) of transmit chains and no receive chains, wherein n is a fixed non-negative integer;
 a second WLAN module configured to communicate using a second wireless protocol; and
 a reception controller configured to determine information regarding communications transmitted according to the first wireless protocol based on communications received via the second WLAN module.

13. The wireless communications device of claim 12, wherein the first WLAN module is configured to retransmit data indicated as not being successfully received based on the information.

14. A method for wireless communications by a wireless communications device, comprising:
 operating a first wireless local area network (WLAN) module to communicate using a first wireless protocol, the first WLAN module having at least a number (n) of transmit chains and no transmit chains, wherein n is a fixed non-negative integer;
 operating a second WLAN module to communicate using a second wireless protocol; and
 determining information regarding communications transmitted according to the first wireless protocol based on communications received via the second WLAN module.

15. The method of claim 14, further comprising retransmitting data indicated as not being successfully received based on the information.

16. A non-transitory processor-readable medium storing instructions that, when executed by a processor of a wireless communications device, causes the wireless communications device to:
 operate a first wireless local area network (WLAN) module to communicate using a first wireless protocol, the first WLAN module having at least a number (n) of transmit chains and no receive chains, wherein n is a fixed non-negative integer;
 operate a second WLAN module to communicate using a second wireless protocol; and
 determine information regarding communications transmitted according to the first wireless protocol based on communications received via the second WLAN module.

17. The non-transitory processor-readable medium of claim 16, wherein execution of the instructions further causes the wireless communications device to retransmit data indicated as not being successfully received based on the information.

\* \* \* \* \*